United States Patent

Di Giacomo et al.

[11] Patent Number: 5,851,635
[45] Date of Patent: Dec. 22, 1998

[54] DEVICE FOR THE TRANSMITTING MOTION WITH A REDUCED NOISINESS AND BELTS SUITABLE FOR THE PURPOSE

[75] Inventors: Tommaso Di Giacomo, Guardiagrele; Mauro Piccirilli, Isernia; Massimo Matricardi, Ortona, all of Italy

[73] Assignee: Dayco PTI, S.p.A., Chieti Scalo, Italy

[21] Appl. No.: 497,744

[22] Filed: Jul. 3, 1995

[30] Foreign Application Priority Data

Aug. 2, 1994 [IT] Italy .................................. MI94A1679

[51] Int. Cl.⁶ .............................. B32B 3/30; B32B 25/04; F16G 1/28; F16G 5/04
[52] U.S. Cl. ........................ 428/167; 428/421; 508/181; 508/182; 508/589; 508/590; 474/91; 474/248; 474/249; 474/252; 474/265
[58] Field of Search ..................... 428/909, 421, 428/422, 167; 252/19, 11, 12, 12.2, 58; 100/151; 474/248, 206, 91; 198/957

[56] References Cited

U.S. PATENT DOCUMENTS

| | | | |
|---|---|---|---|
| 4,003,784 | 1/1977 | Heim et al. | 162/199 |
| 4,064,299 | 12/1977 | Martin | 418/102 |
| 4,889,939 | 12/1989 | Caporiccio et al. | 549/13 |
| 4,978,463 | 12/1990 | Satoji | 252/12 |
| 5,000,864 | 3/1991 | Strepparola et al. | 252/51.5 A |
| 5,051,158 | 9/1991 | Marchionni et al. | 204/157.6 |
| 5,284,456 | 2/1994 | Connell et al. | 474/91 |
| 5,300,999 | 4/1994 | Koh et al. | 355/289 |

*Primary Examiner*—Vivian Chen
*Attorney, Agent, or Firm*—Stevens, Davis, Miller & Mosher, L.L.P.

[57] ABSTRACT

A device for transmitting motion comprises a flexible elastomeric element and at least one rigid element in surface contact with one another, wherein the surface of said flexible elastomeric element that comes into surface contact with said rigid element has been surface treated with a halogenated polyether.

29 Claims, 2 Drawing Sheets

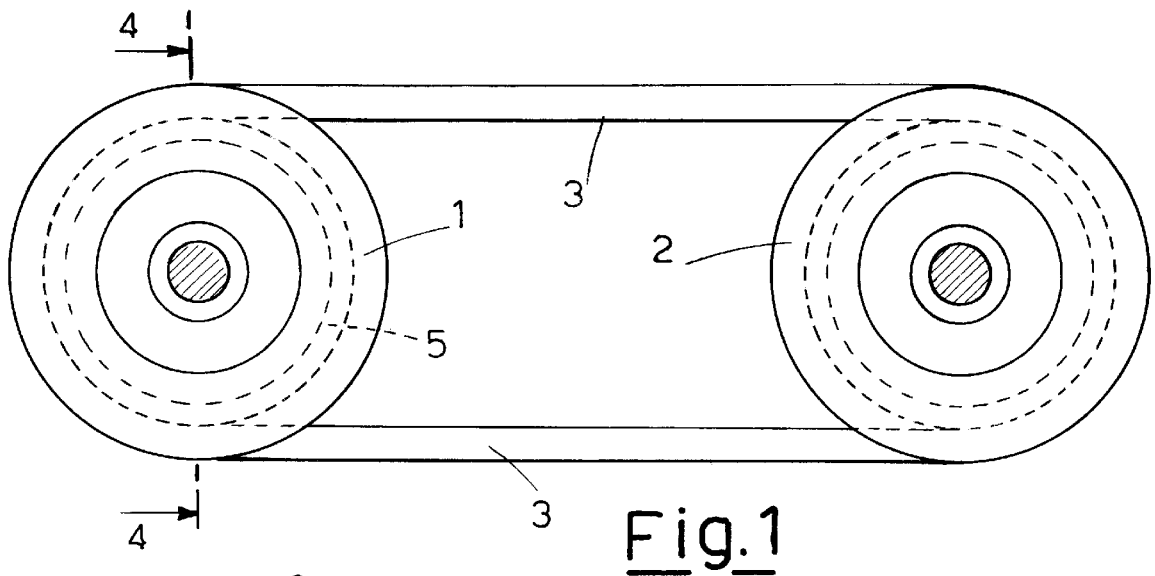
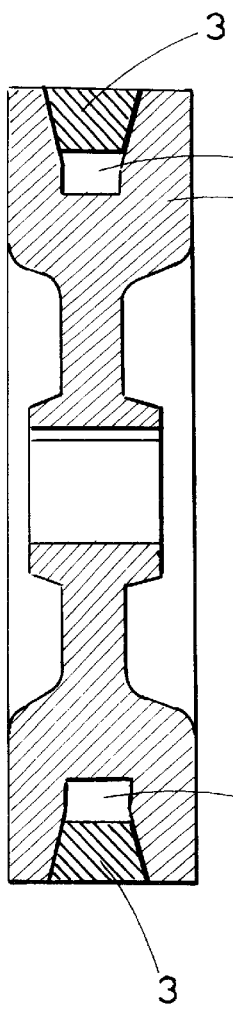
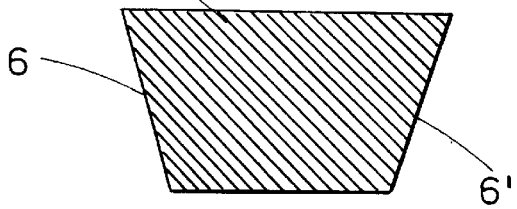

DEVICE FOR THE TRANSMITTING MOTION WITH A REDUCED NOISINESS AND BELTS SUITABLE FOR THE PURPOSE

BACKGROUND OF THE INVENTION

The present invention relates to a device for transmitting motion with a reduced noisiness and belts suitable for the purpose.

More in particular, the present invention relates to the reduction of the noisiness during the functioning of drives for transmitting motion by means of belts.

It is known that many devices for transmitting motion comprise a flexible elastomeric element and at least one rigid element in surface contact one with the other. Typically a device of this type comprises at least two pulleys connected together by a closed-ring flexible elastomeric belt.

In general, the pulleys have a variable-amplitude race, a toothing, a surface with a number of grooves or a cylindrical surface. In the first case the belt has a substantially trapezoidal cross-section and it engages the race of each pulley with its sides. In the second case, the belt is itself also toothed so as to mesh with the toothing of the pulley. In the third case the belt has a plurality of V-shaped or trapezoidal cross-section protrusions, known as ribs. In the fourth case the belt is flat but, once tight, it embraces an arc of the cylindrical surface of the pulley.

In all these cases there is a certain noisiness.

In the case of transmissions with toothed belts the noisiness is permanent and is probably due to the impact between the tooth of the belt and the tooth of the pulley every time a tooth of the belt meshes with the toothing of the pulley.

However, in the case of the other types of transmission with belts operating through friction, the noisiness appears mainly in the form of transitory peaks, especially noticeable when the transmission is subjected to changes in torque or to oscillations of the load typical of pulsating accessories such as, in belt-operated transmissions of motion in motorcars, compressors and power-assisted steering pumps. Again as regards belt-operated transmissions of motion in motorcars, noisiness can also be due to irregularities of the rotation of the driving shaft under conditions of stationary motion.

To this day various solutions have been proposed to overcome the abovementioned drawback, particularly with reference to trapezoidal belts.

Since the reduction of noisiness obtainable with lubricants is transitory and controllable with difficulty due to their volatility and degradability over time, it has been proposed that permanent modifications be introduced in the structure of the belt.

For example, the Belgian patent No. 734.853 proposes to coat a belt of elastomeric polyurethane with a polyamide, particularly by coating the die with polyamide before pouring into said die a suitable hardening reaction mixture that forms the polyurethane. However, this solution has several drawbacks. First of all it implies that the polyurethane and the polyamide have substantially the same modulus of elasticity, otherwise their contact surfaces would come unstuck. In the second place its production method is costly.

The Italian patent No. 1.201.173 teaches on the other hand a belt wherein the part in contact with the pulleys has a plurality of particles of plastic material firmly anchored to the belt and that form an interface with protrusions, asperities and such like. However, when these particles are added to the mixture before curing, the entire structure of the belt is non-homogeneous. While, when the particles are applied only to the surface, a further heat treatment is required so that they can be anchored to the belt and this raises their cost. Another drawback of this solution is constituted by the fact that the above mentioned asperities do not withstand prolonged friction with the pulleys and are removed in a short time.

In general, all methods have the object of reducing the noisiness of belts by means of permanent changes of their structure but they increase production costs substantially.

BRIEF SUMMARY OF THE INVENTION

It has now been found that the noisiness of transmissions of motion of the type indicated above is substantially reduced when the surfaces of the belts in contact with the pulleys are treated with a halogenated polyether.

A first object of the present application is thus constituted by a device for transmitting motion of the type comprising a flexible elastomeric element and at least one rigid element in surface contact with one another, characterized in that the surface of said flexible elastomeric element that comes into surface contact with said rigid element has been treated with a halogenated polyether.

Preferably, said halogenated polyether is a semisolid or liquid fluorinated polyether.

DETAILED DESCRIPTION OF THE INVENTION

In general, liquid halogenated polyethers used according to the present invention have a molecular weight of from 1,500 to 10,000 and, preferably, from 4,000 and 7,000. In turn, the preferred semisolid halogenated polyethers have a kinematic viscosity of from 35 to 2,000 and, even more preferably, from 300 to 700 centistokes Kinematic viscosity is measured at room temperature (about 20° C.);.

An example of a suitable halogenated polyether according to the present invention is represented by the compound of formula

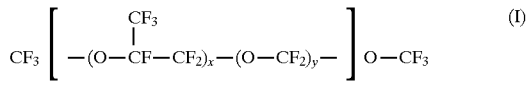

where x/y=40.

A typical compound of this family is FOMBLIN of the Ausimont Company.

The abovementioned treatment has given excellent results both on belts obtained from a die and on belts obtained by cutting with a grinding wheel or with shears.

As is known, to the mixtures for the production of belts by the process of the formation of grooves by tools, it is preferred to add fibres to harden the mixture and thus make it easier to execute the cut to form the grooves of poly-V belts. During this step the fibres break and fray along the cutting lines giving rise to an irregular surface structure advantageous according to the present invention because it encourages restraining the halogenated polyether.

For the purposes of the present invention it has been found that the mixture can contain up to 40, preferably less than 20, even more preferably less than about 6 parts by weight of fibres. One limit of the fibres is that, if the notching effect of the surface of the ribs is increased, they can encourage the breakage of the ribs under the action of fatigue stresses.

Neither does the porosity of the rubber constitute a disadvantage for the purposes of the present invention because, as has already been said, the irregularities of the surface encourage the halogenated polyether to stick to the surface itself.

In general, the type of elastomer used for the production of the belt does not represent a critical feature of the present invention. Examples of suitable elastomers are those made of polybutadiene, polychloroprene, alkylenated chlorosulfonate polyethylene, hydrogenated nitrile and the like.

The treatment of the belt according to the present invention simply consists in applying a very small quantity of a halogenated polyether to the belt, preferably only to the parts capable of coming into contact with the pulley. Examples of suitable techniques are smearing, immersing, spraying, applying the halogenated polyether to the die in which the belt is later formed and the like.

The temperature at which the halogenated polyether is applied to the belt is not critical. But it is preferred to apply it at room temperature.

With particular reference to the compound of formula I, the quantity of halogenated polyether applied to the belt preferably is of from 2 to 18 mg/cm$^2$; even more preferably said quantity is of from 4 to 10 mg/cm$^2$.

After a suitable quantity of halogenated polyether has been put in contact with the belt, it tends to permeate a very thin layer on the surface of the belt itself. Preferably, the permeation thickness is of from 0.05 to 0.5 mm, even more preferably it is of from 0.1 to 0.3 mm.

A relevant feature of the present invention is that the favourable effect of the halogenated polyether on the noisiness of the belt lasts over time.

In comparison with an untreated belt, the degree of the reduction of noisiness of the transmission device according to the present invention is of at least 10 decibels, approximately, in the frequency range of from 3,500 to 5,000 Hz and such reduction lasts even after accelerated aging of the belt at about 100° C. for at least 50 hours on a dynamic test bench type SAE J1596.

BRIEF DESCRIPTION OF THE DRAWING(S)

The present invention will be further described with reference to two non-limiting embodiments thereof illustrated in the enclosed drawings wherein:

FIG. 1 is a side view of a device for the transmission of motion according to the present invention;

FIG. 2 is a transversal cross-section of the flexible elastomeric element only of FIG. 1 treated with a halogenated polyether;

FIG. 3 is a vertical cross-section taken along the plane 4—4 of FIG. 1;

The FIGS. from 1 to 3, refer to a first device for the transmission of motion, particularly for mopeds and washing machines, known as a "speed variator". Said device comprises a pair of rigid elements constituted by the pulleys 1 and 2, one of which has a race whose aperture can be varied in a controlled manner.

The race 5 of the pulleys are engaged by the flexible elastomeric element that, in the case illustrated, is a closed-ring trapezoidal belt 3. Said belt 3 is elastically extendable to adapt itself promptly and autonomously to the instantaneous variation in the width of the race of one of the two pulleys 1 and 2.

The pulleys of this type and the trapezoidal belts are well known in the construction of "speed variators".

FIG. 2 also shows that the part of the belt 3 that comes into surface contact with the pulleys is constituted by the inclined faces 6 and 6' of FIG. 3 on which FOMBLIN has been applied.

Said application has been made at room temperature with a brush.

Figure 4:
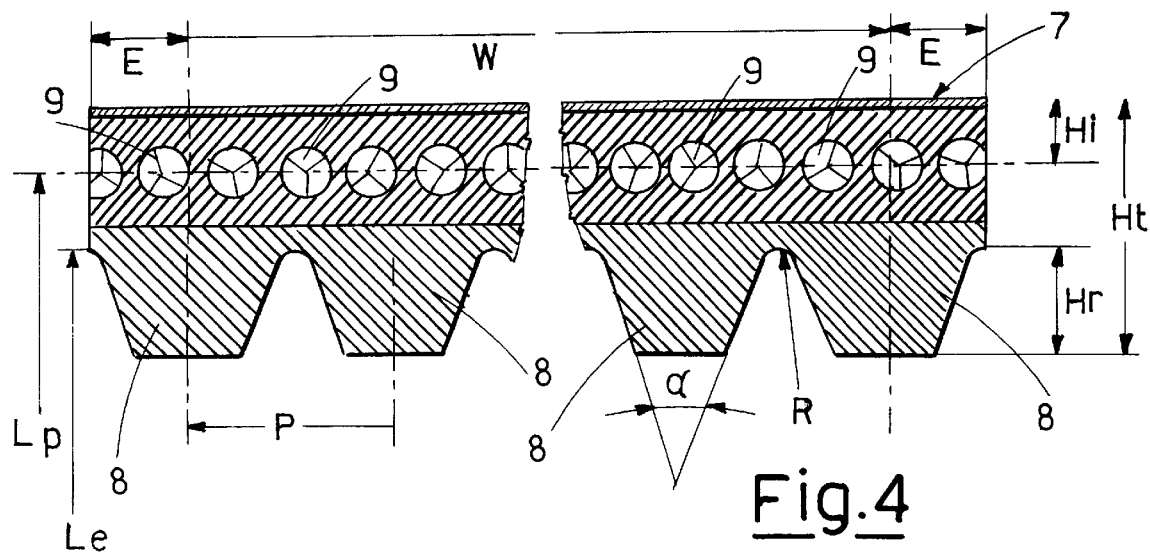
FIG. 4 is part of a transversal cross-sectional view of a second flexible elastomeric element treated with a halogenated polyether.
Figure 5:
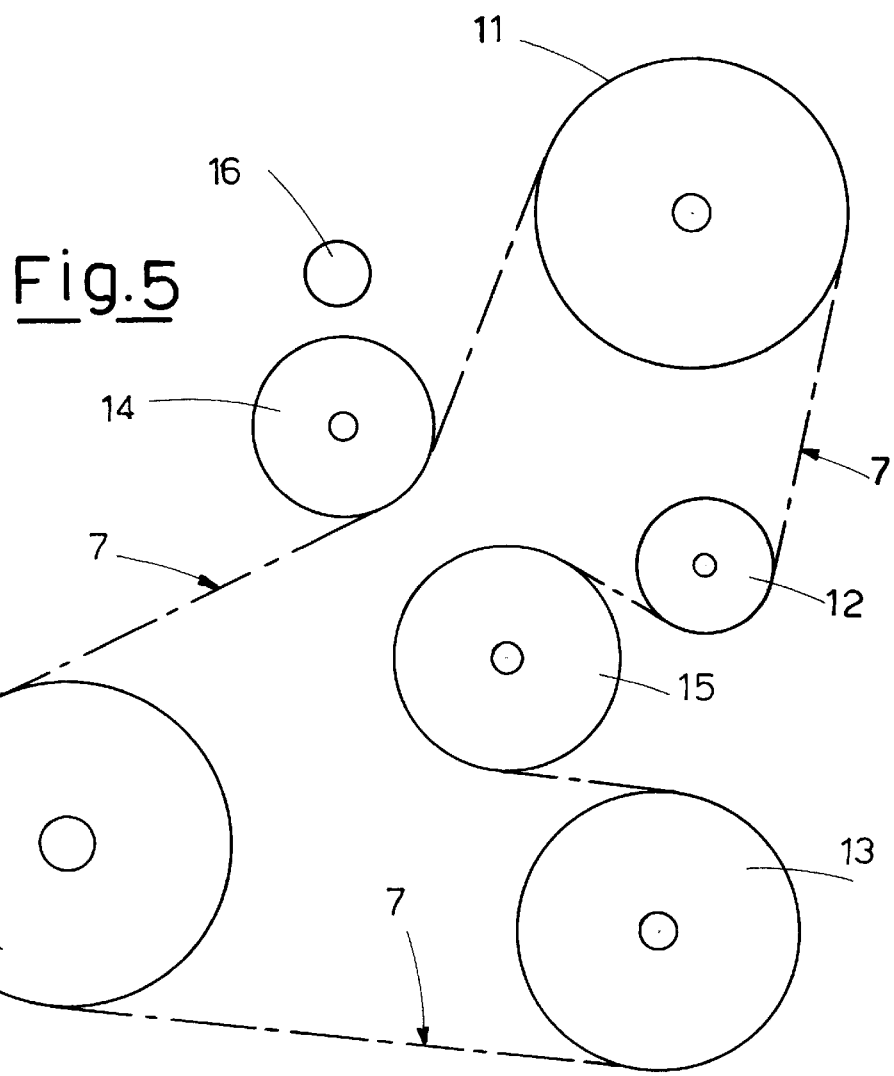
FIG. 5 is a diagramme of a second device for the transmission of motion to which the flexible elastomeric element of FIG. 4 has been applied.

FIGS. 4 and 5 refer to a second device for the transmission of motion, particularly for motor vehicles, known as "transmission for accessories".

There is represented in FIG. 4 a part of a transversal cross-sectional view of a grooved belt 7 comprising a plurality of ribs 8 having a trapezoidal cross-section.

The construction characteristics of the belt 7 are the following:

| | |
|---|---|
| actual length of the belt (Le) | = 1623 mm |
| width of the belt (W) | = 20.8 mm |
| rib pitch (P) | = 3.55 mm |
| number of ribs | = 6 |
| rib angle (alpha) | = 40° |
| rib race connection (R) - approx. | = 0.25 mm |
| total thickness of the belt (Ht) | = 4.6 mm |
| rib height (Hr) | = 2.0 mm |
| back/insert distance (Hi) | = 1.3 mm |
| average insert diameter (9) - approx. | = 0.9 mm |
| average insert pitch - approx. | = 1.25 mm |

On the surface of the grooved belt 7 that will come into contact with the grooved pulleys 10, 11, 12 and 13 of the transmission for accessories of FIG. 5 about 5 mg/cm$^2$ of FOMBLIN halogenated polyether have been applied.

The transmission for accessories of FIG. 5 comprises a driving pulley 10, an automatic tensioner 14, an idle pulley 15, and a plurality of driven pulleys, indicated with 11 for the power-assisted steering system, 12 for the operation of the alternator and 13 for the operation of a compressor, respectively. As seen on FIG. 5, parts 14, 15, 11, 12 abd 13 are driven to move by the belt which is driven by driving pulley 10.

Said driving pulley 10 is connected to the engine of a motor vehicle; in particular to a petrol-driven heat engine, 5 cylinders, 2300 cc, supercharged by means of a turbocompressor, with an automatic transmission, with the following nominal characteristics:

| | |
|---|---|
| maximum rating | 166 KW at 5,280 rpm; |
| maximum torque | 300 Nm. |

In said transmission for accessories there is an unacceptable noisiness due to the belt 7 not treated with halogenated polyethers when the engine runs at about 850 rpm (idling speed) under the following conditions:

belt life ranging from 5,000 to 10,000 km;

engine temperature stabilisation (hot engine);

compressor and alternator absorbing the maximum possible load under said running conditions;

stabilisation of the temperature and the pressure of the compressor cooling fluid;

"drive" position of the automatic transmission with braked wheels.

The same type of noisiness can be induced in a belt not treated with halogenated polyethers by subjecting it to accelerated aging by means of a dynamic test on a bench at 100° C., capable of causing, in 50 hours, an aging effect similar to that encountered in a belt mounted in a motorcar driven on the road for 5,000–10,000 km.

Noisiness has been measured by placing a microphone 16 ("Condenser Microphone Type 4165" by Breul & Kjer) about 3 cm from the pulley 14 of the automatic belt tightener.

In this way the noisiness has been measured of belts, treated and not treated with halogenated polyethers, both new and subjected to accelerated aging for 50 hours with the method indicated above, that has permitted a simulation of the aging effect encountered in a belt mounted in a motorcar driven on the road for 5,000–10,000 km.

The above measurements have demonstrated that the treatment of belts with a halogenated polyether causes a reduction in noisiness of about 20%. This reduction also lasts when the abovementioned accelerated aging test is performed for 100 hours.

This persistence of the advantageous effect of halogenated polyethers over time is not found in the known methods used so far to reduce the noisiness due to the functioning of belt transmissions.

We claim:

1. A device for transmitting motion, comprising: a flexible elastomeric element and at least one rigid element in driving surface contact with one another, said rigid element being movable, wherein the surface of said flexible elastomeric element that comes into surface contact with said rigid element has been surface treated with a halogenated polyether, wherein the halogenated polyether has been applied only to the surface of said flexible elastomeric element that comes into contact with said rigid element wherein said polyether permeates a layer on the surface of the elastomeric element the layer having a permeation thickness of 0.05 to 0.5 mm.

2. A device according to claim 1, wherein said halogenated polyether is a semisolid or liquid fluorinated polyether.

3. A device according to claim 1, wherein said halogenated polyether is liquid and has a molecular weight of from 1,500 to 10,000.

4. A device according to claim 3, wherein the molecular weight of said liquid halogenated polyether is from 4,000 to 7,000.

5. A device according to claim 1, wherein said halogenated polyether is semisolid and has a kinematic viscosity of from 35 to 2,000 centistokes.

6. A device according to claim 5, wherein the kinematic viscosity of said semisolid halogenated polyether is from 300 to 700 centistokes.

7. A device according to claim 1, wherein said halogenated polyether has the following formula

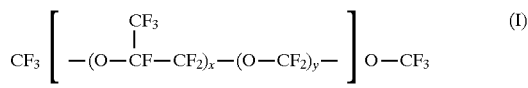

where x/y=40.

8. A device according to claim 1, wherein the surface of said flexible elastomeric element has been treated with lubricant consisting essentially of said halogenated polyether.

9. A device according to claim 1, wherein said flexible elastomeric element is a closed-ring belt obtained from a die or by processing with tools.

10. A device according to claim 1, wherein the quantity of halogenated polyether applied to the said flexible elastomeric element is from 2 to 18 mg/cm$^2$.

11. A device according to claim 10, wherein the quantity of halogenated polyether applied to said flexible elastomeric element is from 4 to 10 mg/cm$^2$.

12. A device according to claim 1, said contact being with sufficient friction for transmitting motion from one of said elements to the other of said elements.

13. A device according to claim 1, wherein said flexible elastomeric element is a belt having at least one longitudinal trapezoidal cross-section.

14. A device according to claim 1, wherein said flexible elastomeric element is a belt dimensioned and configured for use in a speed variator.

15. A device according to claim 1, wherein the elastomeric element is a belt for transmission for accessories for a motor vehicle.

16. A device according to claim 15, wherein the belt for transmission for accessories for a motor vehicle comprises a plurality of longitudinal ribs having a trapezoidal cross-section.

17. A device according to claim 1, wherein said elastomeric element comprises elastomers selected from the group consisting of polybutadiene, polychloroprene, alkylenated chlorosulfonate polyethylene and hydrogenated nitrile.

18. A device according to claim 1, wherein the elastomeric element has been pretreated with a halogenated polyether prior to its inclusion in the device.

19. A device according to claim 1, wherein the elastomeric element only contacts said movable rigid elements.

20. A flexible elastomeric element capable of coming into surface contact with at least one movable rigid element of a device for the transmission of motion, wherein the surface of said flexible elastomeric element that comes into surface contact with said rigid element has been surface treated with a halogenated polyether, wherein the halogenated polyether has been applied only to the surface of said flexible elastomeric element that comes into contact with said rigid element wherein said polyether permeates a layer on the surface of the elastomeric element, the layer having a permeation thickness of 0.05 to 0.5 mm.

21. An element according to claim 20, wherein said halogenated polyether is a semisolid or liquid fluorinated polyether.

22. An element according to claim 20, wherein said halogenated polyether is liquid and has a molecular weight of from 1,500 to 10,000.

23. An element according to claim 22, wherein the molecular weight of said liquid halogenated polyether is from 4,000 to 7,000.

24. An element according to claim 20, wherein said halogenated polyether is semisolid and has a kinematic viscosity of from 35 to 2,000 centistokes.

25. An element according to claim 24, wherein the kinematic viscosity of said semisolid halogenated polyether is from 300 to 700 centistokes.

26. An element according to claim 20, characterized in that said halogenated polyether has the following formula

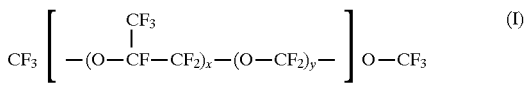

where x/y=40.

27. An element according to claim 20, wherein said flexible elastomeric element is a closed-ring belt obtained from a die or by processing with tools.

28. An element according to claim 20, wherein the quantity of halogenated polyether applied to the said flexible elastomeric element is from 2 to 18 mg/cm$^2$.

29. An element according to claim 28, wherein the quantity of halogenated polyether applied to the said flexible elastomeric element is from 4 to 10 mg/cm$^2$.

* * * * *